May 17, 1938.  H. C. KLIX  2,117,482
CLUTCH LEVER PLATE
Filed May 19, 1937  2 Sheets-Sheet 1

INVENTOR.
Hugo C. Klix
BY
ATTORNEYS.

May 17, 1938.  H. C. KLIX  2,117,482
CLUTCH LEVER PLATE
Filed May 19, 1937   2 Sheets-Sheet 2
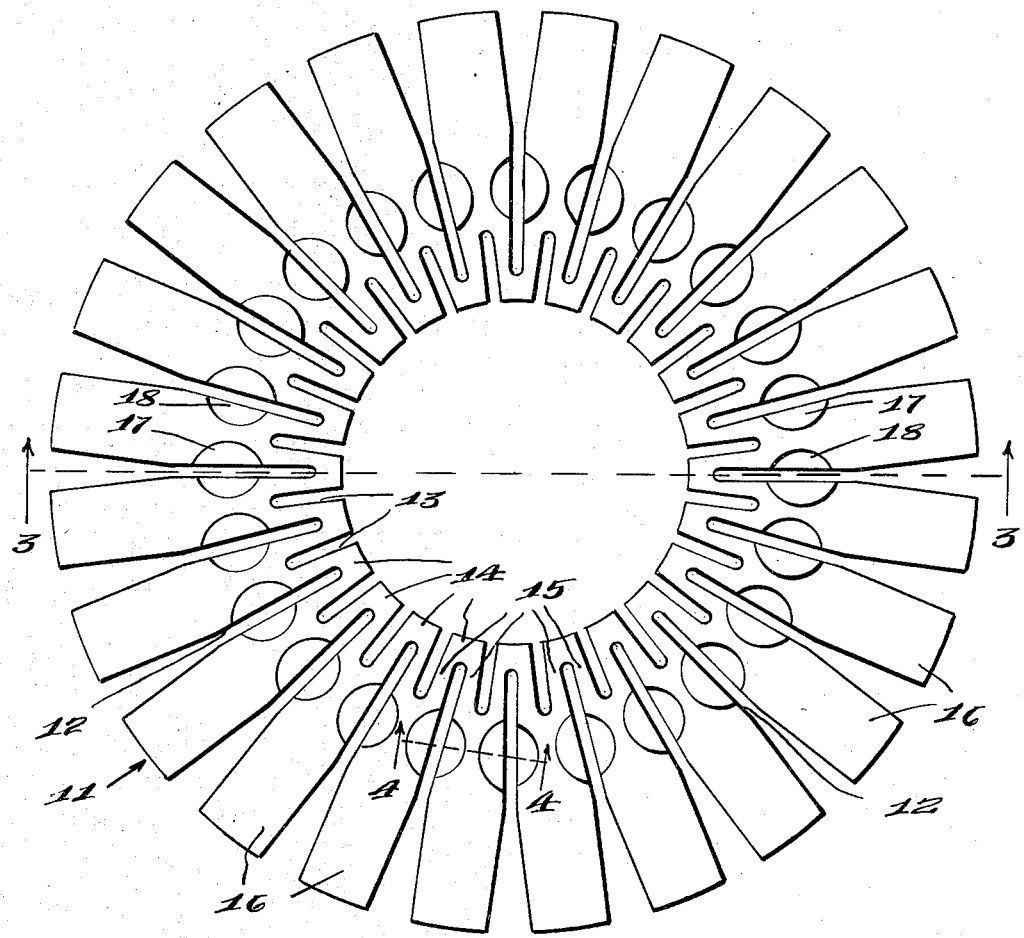
Fig-2-
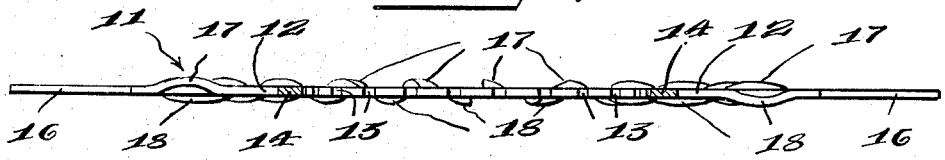
Fig-3-
Fig-4-
INVENTOR.
Hugo C. Klix.
BY Bodell & Thompson
ATTORNEYS.

Patented May 17, 1938

2,117,482

UNITED STATES PATENT OFFICE 2,117,482

CLUTCH-LEVER PLATE

Hugo C. Klix, Syracuse, N. Y., assignor to W. C. Lipe Inc., Syracuse, N. Y., a corporation of New York Application May 19, 1937, Serial No. 143,564

9 Claims. (Cl. 192—99)

This invention relates to clutches, particularly of the type used in motor vehicles and embodying motion transmitting and multiplying levers between a throw-out collar or sleeve and a pressure element or ring of the clutch, and has for its object, a clutch lever element or discoidal plate divided into individual levers flexibly and integrally coupled together, so that the levers, although an integral unit, are so joined as to have individual movement without breaking apart.

More specifically, the invention has for its object a clutch lever element consisting of a discoidal plate having a central opening around the throw-out collar and formed with an annular series or set of slots extending inwardly from its outer edge toward the central opening and a second set of slots alternating with the former slots, arranged midway the same, and extending outwardly from the inner edge of the plate toward the outer edge, and being considerably shorter than the former slots and terminating remote from the outer edge of the plate, so that the levers are integrally connected together by U-shaped couplings at the inner ends of the levers and arranged with the arms of the U formation extending outwardly or in a direction lengthwise of the individual levers.

The invention consists in the novel features and in the constructions and combinations hereinafter set forth and claimed.

In describing this invention, reference is had to the accompanying drawings in which like characters designate corresponding parts in all the views.

Figure 2 is a face view of the clutch lever element or plate.

Figure 3 is a sectional view on line 3—3, Figure 2.

Figure 4 is a sectional view on line 4—4, Figure 2.

Figure 1:
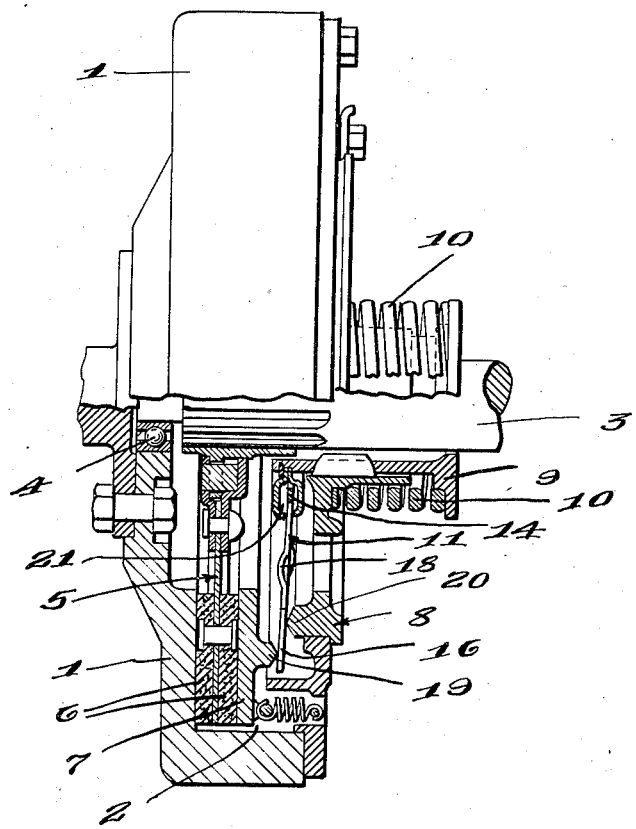
Figure 1 is an elevation, partly in section, of a complete clutch embodying this invention.

1 designates the driving element of a conventional type of clutch used in automotive vehicles, this being usually the fly wheel of the engine of the vehicle. It is formed with a recess 2 in the rear face thereof. 3 designates the clutch shaft, which is usually the drive shaft of the transmission or change-speed gearing of the vehicle or the stem of the stem gear of the transmission, this usually having a pilot bearing at 4 at its front end.

5 is a driven element or disk mounted on the clutch shaft 3 and usually having a hub splined thereon. The clutch disk 5 is provided with the usual friction facings 6 on opposite sides of the margins thereof for coacting with the bottom of the recess and with a pressure ring 7 rotatable with the driving element 1.

8 designates, generally, the back plate structure closing the rear end of the recess 2. 9 designates the throw-out sleeve slidable axially of the clutch shaft 3, and 10 the clutch spring acting on the throw-out sleeve to hold the clutch engaged through the motion transmitting and multiplying levers.

The clutch thus far described is a conventional clutch and per se forms no part of the invention.

The invention resides in a clutch lever element comprising a discoidal plate having a central opening around the throw-out sleeve 9, the plate being divided into an annular series of levers fulcruming on the pressure ring 7 and the back plate 8, the plate being slotted to form the individual levers leaving them connected together by integral couplings near the inner ends thereof, which couplings permit the levers to act more or less individually.

11 designates the discoidal plate which is formed with an annular series of slots 12 extending inwardly, and preferably radially from the outer edge thereof toward the inner edge around the opening and terminating near, but short of, the inner edge of the opening, and with a second annular series of slots 13 extending outwardly from the inner opening and alternating with the slots 12. The slots 13 are preferably located midway between the slots 12. The slots 13, as here shown, extend radially lengthwise of the individual levers and terminate remote from the outer edge of the disk 11. The slots 13 are comparatively short and lap only the inner end portions of the slots 12 forming coupling pieces 14 which are U-shaped in general form in cross section, with the arms 15 of the U formation extending lengthwise of the individual levers 16. This U formation constitutes a resilient coupling means between the individual levers, which coupling means are integral with the levers. Owing to their formation, they are of sufficient extent to distribute any warping or distortion effect throughout a considerable area, so that there is no weakening at any one point tending to break the connections between the levers.

For the purpose of providing ventilating and cooling for the clutch, the individual levers 16 are formed with deflected or arcuate portions 17, 18 in opposite edges thereof, these deflected portions of any two adjacent levers being deflected in opposite directions, as shown in Figure 3, providing passages for air from one side of the lever plate to the other.

The lever plate is tempered so as to be comparatively stiff, but resilient so as to withstand the warping effect during the operation of the clutch.

The plate or the levers thereof coact with fulcrums 19 and 20 on the pressure ring 7 and on the back plate 8 and the inner margins thereof around the central opening are interlocked in a channel 21 of any suitable construction on the inner end of the throw-out sleeve 9. When the clutch element or plate is assembled in the clutch, the force of the clutch spring acting on the throw-out sleeve 9 distorts the clutch plate into somewhat conical form, as seen in Figure 1, and in the throwing out operation of the clutch, when the spring 10 is compressed by the throwing out action of the driver's foot on the clutch pedal, the plate approaches its original or flat discoidal form. During this action of the clutch plate, the inner ends of the individual levers are subject to a warping effect tending to eventually break them, but due to the long coupling pieces, which are preferably U-shaped, this distortion is distributed throughout a comparatively large area and not localized in any one spot, so that the liability of breaking under continued use is eliminated.

What I claim is:

1. A clutch-lever element of the class described comprising an annular series of levers arranged with slots separating them throughout the greater part of their length and being integrally joined together at their inner ends, in combination with a clutch mechanism including a throw-out sleeve provided with an annular channel for receiving the inner ends of the levers so integrally joined together at their inner ends.

2. A clutch-lever element of the class described comprising an annular series of levers arranged with slots separating them throughout the greater part of their length and U-shaped means joining each lever to the adjacent lever at the inner ends thereof and forming an integral part of the levers.

3. A clutch-lever element of the class described comprising an annular series of levers arranged with slots separating them throughout the greater part of their length and U-shaped means joining each lever to the adjacent lever at the inner ends thereof and forming an integral part of the levers, said means arranged with the arms of the U formation extending lengthwise of the levers.

4. A clutch-lever element of the class described comprising a discoidal plate having a central opening and one set of slots extending inwardly from the outer edge of the plate and terminating near and short of the inner edge around the central opening and another set of slots extending outwardly from the inner edge of the plate and alternating with the inner ends of the former slots, thereby forming individual levers flexibly and integrally united at their inner ends.

5. A clutch-lever element of the class described comprising a discoidal plate having a central opening, and one set of slots extending inwardly from the outer edge of the plate toward the central opening and terminating near and short of the central opening, and another set of slots alternating with the former slots and extending outwardly from the inner edge of the plate between the former slots.

6. A clutch-lever element of the class described comprising a discoidal plate having a central opening, and one set of slots extending inwardly from the outer edge of the plate toward the central opening and terminating near and short of the central opening, and another set of slots alternating with the former slots and extending outwardly from the inner edge of the plate between the former slots, and terminating remote from the outer edge of the plate, forming an annular series of radially extending levers and U-shaped pieces integral with the levers and joining each lever with the adjacent lever.

7. The combination with a clutch including a driving element, a clutch shaft, a driven element on the clutch shaft, a pressure ring, a back plate, a throw-out sleeve, and a spring acting on the throw-out sleeve to hold the clutch engaged, the pressure ring and the back plate being formed with fulcrums on their opposing sides, of a clutch-lever element for transmitting motion of the throw-out sleeve to the pressure ring and coacting with said fulcrums, said element comprising a discoidal plate having a central opening around the throw-out sleeve, the sleeve having means for receiving the inner margin of said plate, said plate being formed with an annular set of slots extending inwardly from the outer edge thereof toward the inner edge around the opening and terminating near and short of the inner edge and with a second series of annular slots alternating with the former slots and extending inwardly from the inner edge of the plate and terminating remote from the outer edge of the plate, thereby providing an annular series of levers separated throughout the greater part of their lengths and integrally joined together at their inner ends by a U-shaped means integral with adjacent levers.

8. A clutch-lever element of the class described comprising an annular series of levers arranged with slots separating them throughout the greater part of their length and being integrally joined together at their inner ends, the levers being fixed with deflected portions at their adjacent edges, the deflected portion of each lever being alined in a transverse direction with and oppositely deflected from the deflected portions of the adjacent levers providing passages through the levers.

9. A clutch-lever element of the class described comprising a discoidal plate having a central opening and one set of slots extending inwardly from the outer edge of the plate and terminating near and short of the inner edge around the central opening and another set of slots extending outwardly from the inner edge of the plate and alternating with the inner ends of the former slots, thereby forming individual levers flexibly and integrally united at their inner ends, the levers being fixed with deflected portions at their adjacent edges, the deflected portion of each lever being alined in a transverse direction with and deflected oppositely from the deflected portions of the adjacent levers providing passages through the levers.

HUGO C. KLIX.